United States Patent
Fujita

(10) Patent No.: US 6,686,578 B2
(45) Date of Patent: Feb. 3, 2004

(54) APPARATUS FOR SWEEP SYNCHRONIZATION MEASUREMENT OF OPTICAL WAVELENGTH SENSITIVITY CHARACTERISTICS AND METHOD OF CORRECTING OPTICAL WAVELENGTH SENSITIVITY THEREOF

(75) Inventor: Kiyohisa Fujita, Kanagawa (JP)

(73) Assignee: Ando Electric Co., Ltd., Tokyo (JP)

( * ) Notice: Subject to any disclaimer, the term of this patent is extended or adjusted under 35 U.S.C. 154(b) by 83 days.

(21) Appl. No.: 09/896,652

(22) Filed: Jun. 29, 2001

(65) Prior Publication Data

US 2002/0008194 A1 Jan. 24, 2002

(30) Foreign Application Priority Data

Jun. 29, 2000 (JP) .................................... P. 2000-196147

(51) Int. Cl.[7] .................................... G01J 1/32
(52) U.S. Cl. ........................ 250/205; 250/226; 356/300
(58) Field of Search .............................. 250/252.1, 205, 250/226; 356/300–334, 237.1

(56) References Cited

U.S. PATENT DOCUMENTS 3,646,331 A * 2/1972 Lord ........................ 235/151.3
4,737,652 A * 4/1988 Faschingleitner et al. ... 250/575
6,069,697 A * 5/2000 Tanimoto et al. ........... 356/327

\* cited by examiner

Primary Examiner—Stephone B. Allen
(74) Attorney, Agent, or Firm—Fish & Richardson P.C.

(57) ABSTRACT

Optical wavelength sensitivities in an optical meter used for a sweep synchronization measurement are corrected by a method comprising the steps of measuring a plurality of reference values when no device under test is connected to the optical meter, computing a series of corrective values for the reference values for a plurality of selected reference wavelengths, respectively, such that the reference value at one of the selected reference wavelengths is zero, correcting a plurality of actual measured values using the series of corrective values when an device under test is connected to the optical meter, and displaying the actual measured values corrected.

6 Claims, 2 Drawing Sheets

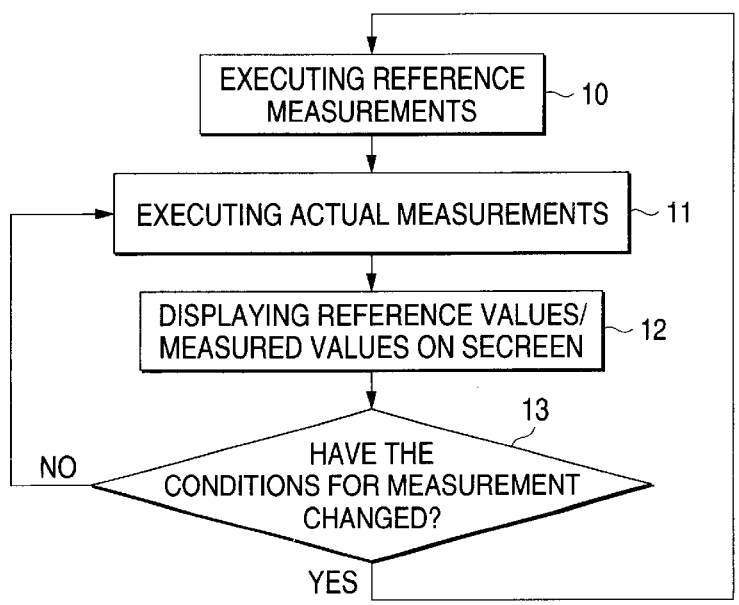
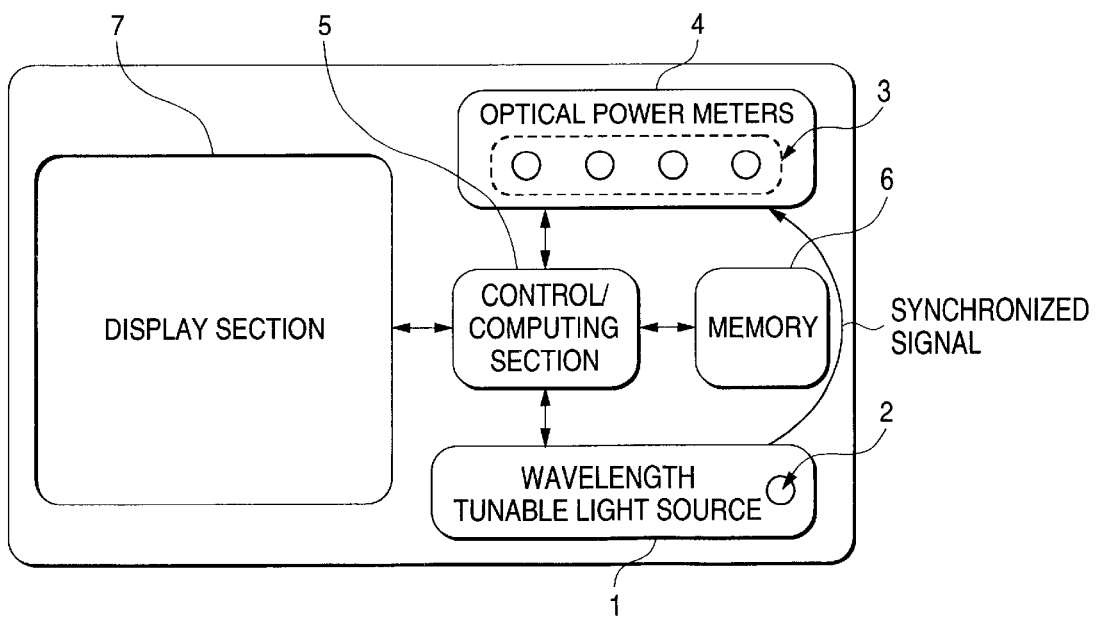

APPARATUS FOR SWEEP SYNCHRONIZATION MEASUREMENT OF OPTICAL WAVELENGTH SENSITIVITY CHARACTERISTICS AND METHOD OF CORRECTING OPTICAL WAVELENGTH SENSITIVITY THEREOF

BACKGROUND OF THE INVENTION

1. Field of the Invention

The present invention relates to a technology for adjusting an apparatus for sweep synchronization measurement of optical wavelength sensitivity characteristics, which comprises a wavelength tunable light source and optical power meters, to have flat optical wavelength sensitivity characteristics.

2. Description of the Related Art

FIG. 3 shows an optical component analyzer as a conventional apparatus for performing a measurement contemplated by the invention. The analyzer comprises a wavelength tunable light source 1, an optical output section 2 for outputting light from the wavelength tunable light source 1, an optical input section 3 of a group of optical power meters 4, and a control/computing section 5. A device under test (not shown), which is to be subjected to a measurement, is connected between the optical output section 2 and the optical input section 3. Being controlled by the control/computing section 5, the wavelength sweep of the wavelength tunable light source 1 is synchronized with the power measurement by the optical power meters so as to measure the optical wavelength sensitivity characteristics of the device under test.

The above-described type of instrument combines the wavelength tunable light source with a group of optical power meters and synchronizes the wavelength sweep of the light source with the power measurement by the optical power meters to measure the optical wavelength sensitivity characteristics of the device under test. In such instruments, it is extremely important that flat optical wavelength sensitivity characteristics be maintained in through-measurements which are performed prior tot actual measurements, with no device under test connected.

FIG. 2 is a flowchart for the measurements performed in the conventional art. As shown, the process comprises the following four major steps.

Step 10 in which with no device under test connected between the optical output section 2 and the optical input section 3, through-measurements are performed over the entire wavelength range of measurement at predetermined sampling intervals and the measured values are saved as reference values in an internal memory 6.

Step 11 in which actual measurements are executed with the device under test connected between the optical output section 2 and the optical input section 3.

Step 12 in which the differences between the saved reference values and the actual measured values obtained in step 11 are determined and shown on a display section 7.

Step 13 in which a check is made to see if the conditions for the actual measurements with the device under test connected are varied from those for the through-measurements and if the answer is yes, another cycle of through-measurements is run to determine a new set of reference values.

In order to ensure that flat optical wavelength sensitivity characteristics are maintained in through-measurements, the following sequence of steps have been taken in the conventional art.

First, through-measurements (with no device under test connected) are performed under the same conditions as the measurements to be performed with the device under test connected and their results are saved as reference values in the internal memory 6.

Then, measurements are performed with the device under test connected, the measured values are subtracted from the reference values, and the results of comparison are shown on the display section 7.

Even if no flat optical wavelength sensitivity characteristics were maintained in the through-measurements, the results of the actual measurements with the device under test connected contain the same optical wavelength sensitivity characteristics since they were conducted under the same conditions as the through-measurements. Hence, by subtracting the actual measured values from the results of the through-measurements, the optical wavelength sensitivity characteristics for the through-measurements are effectively cancelled and those of the device under test are correctly shown on the display section 7.

In order to justify the accuracy of the above-described method, the through-measurements must be performed under the same conditions as the actual measurements with the device under test connected. If there is a change in the conditions for the actual measurements with the device under test connected, the previously used reference values (as obtained by the through-measurements) are no longer applicable.

SUMMARY OF THE INVENTION

An object, therefore, of the present invention is to ensure that the optical wavelength sensitivity characteristics of a device under test can be measured correctly with an apparatus for sweep synchronization measurement of optical wavelength sensitivity characteristics by maintaining flat optical wavelength sensitivity characteristics during through-measurements.

The stated object of the invention can be attained by an apparatus which corrects the optical wavelength sensitivity of its optical power meters by combination of:

a means of measuring reference values with no device under test connected;

a means of computing a series of corrective values for said reference values at each wavelength such that the measured value at a reference wavelength is zero;

a means of executing the correction of actual measured values using said series of corrective values; and a means of displaying the actual measured values as corrected.

The apparatus may be modified, wherein if the actual measurements are performed under conditions varied from those for the measurements of reference values, said means of computing a series of corrective values produces a new series of corrective values by arithmetic operations on said varied conditions for the actual measurements and said reference values already measured.

The stated object can also be attained by a method for correcting the optical wavelength sensitivity of optical power meters in an apparatus for sweep synchronization measurement of optical wavelength sensitivity characteristics, which comprises the steps of:

(A) measuring reference values with no device under test connected;

(B) computing a series of corrective values for said reference values at each wavelength such that the measured value at a reference wavelength is zero;

(C) executing the correction of actual measured values using said series of corrective values; and (D) displaying the actual measured values as corrected.

The method may be modified, wherein the computation of a series of corrective values in step (B) is such that if the actual measurements are performed under conditions varied from those for the measurements of reference values, a new series of corrective values are produced by arithmetic operations on said varied conditions for the actual measurements and said reference values already measured.

The method may also be modified, wherein the computation of a series of corrective values in step (B) is executed by interpolating the series of corrective values.

BRIEF DESCRIPTION OF THE DRAWINGS

FIG. 2 is a flowchart for executing correction of wavelength sensitivity in the conventional art.

FIG. 3 is a block diagram for the apparatus of the invention for sweep synchronization measurement of optical wavelength sensitivity characteristics.

DETAILED DESCRIPTION OF THE PRESENT INVENTION

Figure 1:
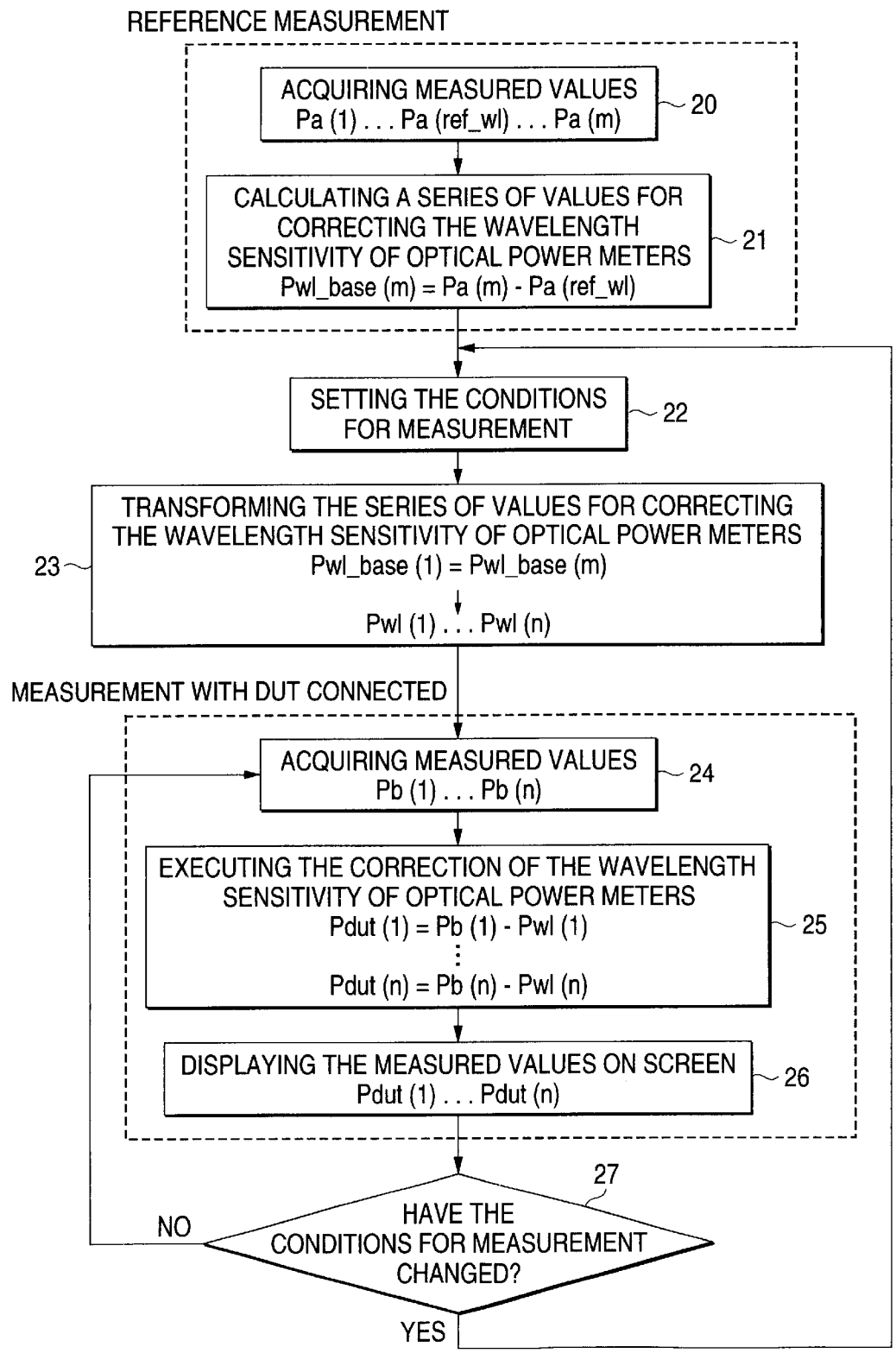
FIG. 1 is a flowchart for executing correction of wavelength sensitivity in accordance with the present invention.

The present invention will be described in detail with reference to the accompanying drawings.

FIG. 3 shows a sweep synchronization measurement apparatus for measuring optical wavelength sensitivity characteristics according to the invention.

The sweep synchronization measurement apparatus comprises a wavelength variable light source 3, a plurality of optical power meters 4, a control/computing section 5, an internal memory 6 and a display section 7.

The wavelength variable light source 3 includes an optical output section, from which light having a predetermined wavelength is outputted to a device under test. The wavelength of the light emitted therefrom is variable.

Each of the plurality of optical power meters 4 has an optical input section 3, and receives the light from the device under test at the optical input section 3. Measurements of the optical power meters 4 synchronize with the wavelength of the light emitted from the wavelength variable light source. Therefore, the optical level of the light passing through the device under test can be measured for each wavelength.

The control/computing section 5 totally controls the wavelength variable light source 1, the optical power meters 4, the internal memory 6 and the display section 7.

FIG. 1 is a flowchart for measurements performed according to the present invention. As shown in FIG. 1, the process comprises the following steps.

In step 20, under the condition that no device under test is connected between the optical output section 2 and the optical input section 3, through-measurements (reference measurements) are performed to acquire measured values over the entire wavelength range of measurement at predetermined sampling intervals. The measured values as acquired are stored in the internal memory 6.

In step 21, corrective value for the measured values acquired in step 20 are calculated for each of the sampled wavelengths of measurement such that the measured value at a reference wavelength measured in step 20 is zero, whereby a series of corrective values for the optical wavelength sensitivity of optical power meters are determined and stored in the internal memory 6.

In step 22, any new conditions for measurement is varied from the previous measurement (in the case under consideration, the sampling number is changed from m to n).

In step 23, the series of corrective values stored in step 21 are transformed to match the new conditions for measurement that have been set in step 22.

In step 24, actual measurements are executed with the device under test connected between the optical output section 2 and the optical input section 3.

In step 25, the differences between the stored series of corrective values and the actual measured values as obtained in step 24 are determined.

In step 26, the values calculated in step 25 are shown on the display section 7.

In step 27, a check is made to see if the conditions for the actual measurements with the device under test connected are varied from those for the through-measurements and if the answer is yes, a second cycle of through-measurements is not run but the sequence returns to step 22 so that the new conditions for measurement are set and a new series of corrective values are calculated.

Specific measurements in accordance with the flowchart in FIG. 1 are described below in detail using actual numeric values.

First, with no device under test connected between the optical output section 2 and the optical input section 3, through-measurements (reference measurements) for a sampling number of m are executed over the entire wavelength range of measurement at the same sampling interval as for the values of correcting the optical wavelength sensitivity of optical power meters (for example, at 1 nm) and the measured values as obtained $Pa(1), \ldots Pa(ref\_wl), \ldots Pa(m)$ are stored in the internal memory 6.

Then, corrective values for the values of through-measurements as saved in the internal memory 6 are calculated at each wavelength of measurement such that the measured value $Pa(ref\_wl)$ at a reference wavelength (say, 1550 nm) is zero, thereby determining a series of corrective values $Pwl\_base(m)=Pa(m)-Pa(ref\_wl)$, which are stored in the internal memory 6 for use in correcting the results of the subsequent actual measurements with the device under test connected.

Then, in step 27, a check is made to see if the conditions for the actual measurements with the device under test connected are varied from those for the through-measurements and if the answer is yes, a second cycle of through-measurements is not run but the new conditions for measurement (in the case under consideration, the sampling number is changed from m to n) are set and the present series of corrective values $Pwl\_base(1), \ldots Pwl\_base(m)$ are transformed to a new series $Pwl(1), \ldots Pwl(n)$.

With the device under test connected between the optical output section 2 and the optical input section 3, the acquisition of actual measured values $Pb(1), \ldots Pb(n)$ is executed and for each wavelength of measurement, correction of the optical wavelength sensitivity of the optical power meters is executed as follows and the results of the correction are shown on the display section 7:

$$Pdut(1)=Pb(1)-Pwl(1), \ldots Pdut(n)=Pb(n)-Pwl(n)$$

If the sampling interval for corrective values is wider than in the actual measurements, the series of corrective values are interpolated to calculate a new series of corrective values for which the sampling interval is equal to that of the actual measurements.

According to the invention, the apparatus corrects the optical wavelength sensitivity of its optical power meters by combination of:

a means of measuring reference values with no device under test connected;

a means of computing a series of corrective values for said reference values at each wavelength such that the measured value at a reference wavelength is zero;

a means of executing the correction of actual measured values using said series of corrective values; and a means of displaying the actual measured values as corrected.

Since the corrective values computed for the respective wavelengths such that the measured value at the reference wavelength is zero are saved in the internal memory as a series of corrective values, the optical wavelength sensitivity characteristics for the actual measurements can be easily corrected.

In the apparatus, if the actual measurements are performed under conditions varied from those for the measurements of reference values, said means of computing a series of corrective values produces a new series of corrective values by arithmetic operations on said varied conditions for the actual measurements and said reference values already measured. As a result, even if there occurs a change in the conditions for measurement, there is no need to execute a second measurement of reference values but a new series of corrective values matching the new conditions for measurement can be obtained by arithmetic operations.

According to the invention, the method is for correcting the optical wavelength sensitivity of optical power meters in an apparatus for sweep synchronization measurement of optical wavelength sensitivity characteristics, and it comprises the following steps in sequence:

(A) measuring reference values with no device under test connected;

(B) computing a series of corrective values for said reference values at each wavelength such that the measured value at a reference wavelength is zero;

(C) executing the correction of actual measured values using said series of corrective values; and (D) displaying the actual measured values as corrected.

By this method, the optical wavelength sensitivity characteristics for the actual measurements with the device under test connected can be easily corrected.

In the method, the computation of a series of corrective values in step (B) is such that if the actual measurements are performed under conditions varied from those for the measurements of reference values, a new series of corrective values are produced by arithmetic operations on said varied conditions for the actual measurements and said reference values already measured. As a result, even if there occurs a change in the conditions for measurement, there is no need to execute a second measurement of reference values but a new series of corrective values matching the new conditions for measurement can be obtained by arithmetic operations.

In the method, the computation of a series of corrective values in step (B) is executed by interpolating the series of corrective values. As a result, even if the sampling interval for corrective values is wider than in the actual measurements, a new series of corrective values can be created by interpolating the series of corrective values and there is no need to execute the measurement of new reference values.

What is claimed is:

1. A method of correcting optical wavelength sensitivities in an optical meter used for a sweep synchronization measurement, the method comprising the steps of:

measuring a plurality of reference values when no device under test is connected to the optical meter;

computing a series of corrective values for the reference values for a plurality of selected reference wavelengths, respectively, such that the reference value at one of the selected reference wavelengths is zero;

correcting a plurality of actual measured values using only the series of corrective values when a device under test is connected to the optical meter; and displaying the actual measured values corrected.

2. The method according to claim 1, wherein the series of corrective values are computed such that if the actual measurement is performed under a condition different from the condition for measuring the reference values, a new series of corrective values are produced by an arithmetic operation based on the condition for the actual measurement and the reference values measured.

3. The method according to claim 2 including interpolating the series of corrective values to obtain the new series of corrective values.

4. An apparatus for a sweep synchronization measurement, the apparatus comprising:

an optical meter for measuring a plurality of reference values when no device under test is connected to the optical meter;

a controller for computing a series of corrective values for the reference values for a plurality of selected reference wavelengths, respectively, such that the reference value at one of the selected reference wavelengths is zero, the controller for correcting a plurality of actual measured values using only the series of corrective values when a device under test is connected to the optical meter; and a display for displaying the actual measured values corrected.

5. The apparatus according to claim 4, wherein the series of corrective values are computed such that if the actual measurement is performed under a condition different from the condition for measuring the reference values, a new series of corrective values are produced by an arithmetic operation based on the condition for the actual measurement and the reference values measured.

6. The apparatus according to claim 5, wherein the controller is for interpolating the series of corrective values to obtain the new series of corrective values.

* * * * *